United States Patent
Goodemote et al.

(10) Patent No.: US 8,392,745 B2
(45) Date of Patent: Mar. 5, 2013

(54) MODULAR INTEGRATED CIRCUIT WITH CLOCK CONTROL CIRCUIT

(75) Inventors: Greg Goodemote, Tustin, CA (US);
Khan Kibria, Mission Viejo, CA (US);
Mark N. Fullerton, Austin, TX (US);
Niray P. Dagli, Placentia, CA (US);
Liang Deng, Sunnyvale, CA (US); Sam Liu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 389 days.

(21) Appl. No.: 12/767,226

(22) Filed: Apr. 26, 2010

(65) Prior Publication Data

US 2011/0264946 A1    Oct. 27, 2011

(51) Int. Cl.
*G06F 1/00*    (2006.01)

(52) U.S. Cl. ......... 713/501; 713/300; 713/320; 713/322

(58) Field of Classification Search .................. 713/300, 713/320, 322, 501
See application file for complete search history.

(56) References Cited

U.S. PATENT DOCUMENTS

| | | | | |
|---|---|---|---|---|
| 5,887,179 | A * | 3/1999 | Halahmi et al. | 713/324 |
| 7,696,641 | B2 * | 4/2010 | Tomita | 307/31 |
| 7,809,068 | B2 * | 10/2010 | Seto et al. | 375/260 |
| 2002/0016904 | A1 * | 2/2002 | Chrysanthakopoulos | 712/24 |
| 2003/0217295 | A1 * | 11/2003 | Sadowski | 713/300 |
| 2005/0210301 | A1 * | 9/2005 | Nokkonen | 713/300 |
| 2007/0168499 | A1 * | 7/2007 | Chu | 709/224 |
| 2009/0158060 | A1 * | 6/2009 | Vaajala | 713/300 |
| 2010/0229011 | A1 * | 9/2010 | Pedersen et al. | 713/322 |
| 2010/0281309 | A1 * | 11/2010 | Laurenti et al. | 714/45 |

* cited by examiner

*Primary Examiner* — Vincent Tran
(74) *Attorney, Agent, or Firm* — Garlick & Markison; Bruce E. Stuckman (57) ABSTRACT

A modular integrated circuit includes a hub module that is coupled to a plurality of spoke modules via a plurality of hub interfaces. The hub module includes a clock control circuit, coupled to the plurality of hub interfaces, that selectively supplies a plurality of clock signals to the plurality of spoke modules by receiving a clock request signal from a corresponding one of the plurality of spoke modules via the signal interface of the corresponding one of the plurality of hub interfaces, generating at least one of the plurality of clock signals in response to the clock request signal; and sending the at least one of the plurality of clock signals to the corresponding one of the plurality of spoke modules via the signal interface of the corresponding one of the plurality of hub interfaces.

21 Claims, 9 Drawing Sheets

| | Spoke table 300 | | |
|---|---|---|---|
| Name | Class | Functions | Hardware Address |
| Spoke 1 | UART Ver. A | Debug interface<br>Bluetooth connection<br>Touch screen I/F | X |
| Spoke 2 | RF Transceiver | GSM | Y |
| ... | ... | ... | ... |

MODULAR INTEGRATED CIRCUIT WITH CLOCK CONTROL CIRCUIT

CROSS-REFERENCE TO RELATED APPLICATIONS

The present application is related to the following patent applications that are commonly assigned and concurrently filed herewith:

U.S. application Ser. No. 12/770,690, entitled, MODULAR INTEGRATED CIRCUIT WITH COMMON INTERFACE, filed on Apr. 29, 2010;

U.S. application Ser. No. 12/767,201, entitled, MODULAR INTEGRATED CIRCUIT WITH COMMON SOFTWARE, filed on Apr. 26, 2010;

U.S. application Ser. No. 12/767,208, entitled, MODULAR INTEGRATED CIRCUIT WITH UNIFORM ADDRESS MAPPING, filed on Apr. 26, 2010;

the contents of which is expressly incorporated herein by reference thereto.

BACKGROUND OF THE INVENTION

1. Technical Field of the Invention

This invention relates generally to processing systems and integrated circuits used therein.

2. Description of Related Art

As IC fabrication technology continues to advance, ICs become smaller and smaller, but include more and more components. While this advancement allows for reduction in size of electronic devices, it can present a challenge when implementing the design of a new device. In response device designers frequently attempt to reuse working portions of previous designs to reduce the design cycle and to increase the reliability of a new device. However, increased device complexity requires designers to constantly modify working designs to meet the needs of each new IC. In addition to the device design and layout, verification and validation of a design becomes increasingly expense and time consuming. Further, while some software and firmware may be re-used, design requirements can force software changes not only to provide new features and functions, but also to conform with device modifications.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
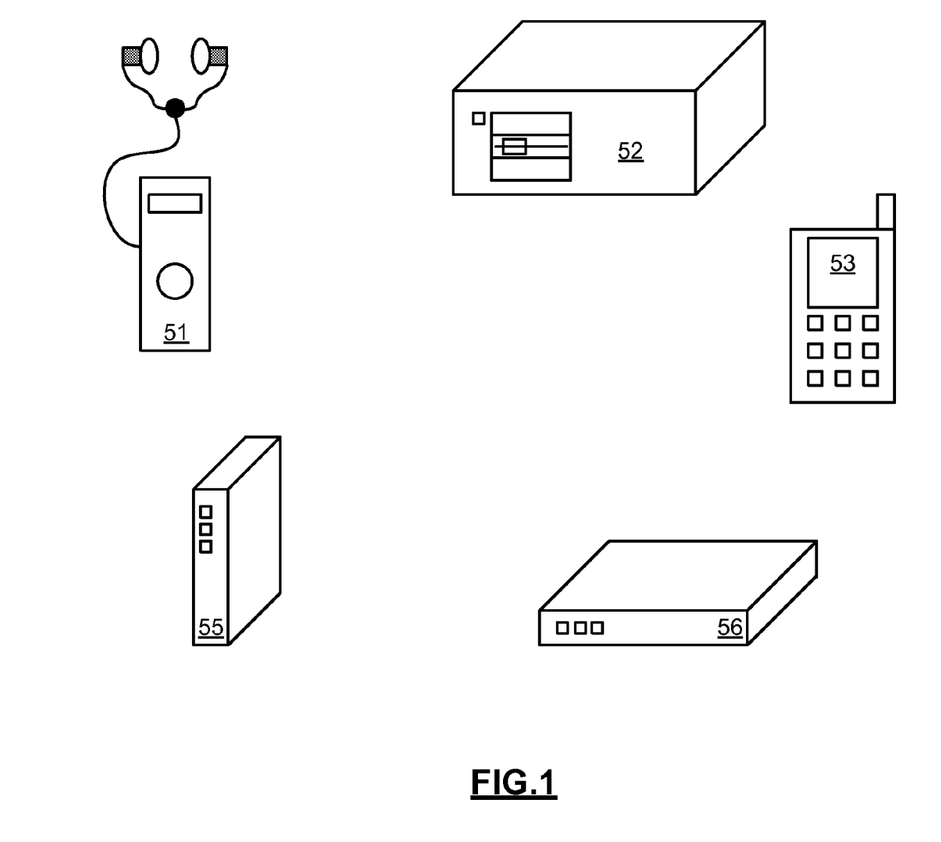
FIG. 1 presents a pictorial representation of a plurality of devices that include a modular integrated circuit in accordance with an embodiment of the present invention.

FIG. 1 presents a pictorial representation of a plurality of devices that include a modular integrated circuit in accordance with an embodiment of the present invention. In particular, handheld audio unit 51 can include a modular integrated circuit as described in conjunction with FIGS. 2-15. In operation, handheld audio unit 51 provides storage and playback of audio content such as motion picture expert group (MPEG) audio layer 3 (MP3) files or Windows Media Architecture (WMA) files, video content such as MPEG4 files for playback to a user, and/or any other type of information that may be stored in a digital format.

Processing device 52 can include a modular integrated circuit as described in conjunction with FIGS. 2-15. Processing device 52 can be a desktop computer, laptop computer, personal computer or a network device such as server or other processing device.

Wireless communication device 53 can include a modular integrated circuit as described in conjunction with FIGS. 2-15. In an embodiment of the present invention, wireless communication device 53 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 53 is capable of communicating via the Internet to access email, download content, access websites, and provide streaming audio and/or video programming. In this fashion, wireless communication device 53 can place and receive telephone calls, text messages such as emails, short message service (SMS) messages, pages and other data messages that can include attachments such as documents, audio files, video files, images and other graphics.

Storage device 54 can include a modular integrated circuit as described in conjunction with FIGS. 2-15. Storage device 54 can include a disk drive, storage array, storage router, edge router, storage switch, storage director, host bus adapter, or other device used for storage, network attached storage or in a storage area network.

Networking device 55 can include a modular integrated circuit as described in conjunction with FIGS. 2-15. Networking device can be a network interface, cable modem, digital subscriber line modem, set-top box, access point, bridge device, a router, packet switch, or other network device.

While particular devices are described above, it should be noted that a modular integrated circuit, as described in conjunction with FIGS. 2-15, can be used in a wide variety of other devices.

Figure 2:
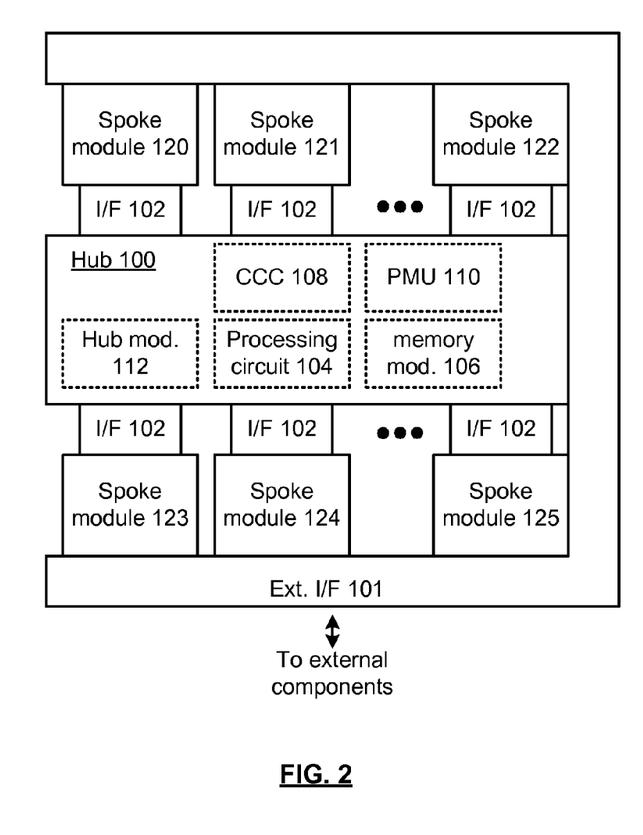
FIG. 2 presents a schematic block diagram representation of a modular integrated circuit in accordance with an embodiment of the present invention.

FIG. 2 presents a schematic block diagram representation of a modular integrated circuit in accordance with an embodiment of the present invention The integrated circuit includes a plurality of spoke modules 120-125 and a hub 100 that is coupled to the plurality of spoke modules 120-125 via a corresponding plurality of hub interfaces 102. In particular, a hub and spoke architecture is employed where, for instance, some functions are performed by the spoke modules 120-125 and other functions common to one or more spoke modules 120-125 can be included in the hub 100. This non-bus architecture for connecting the spoke modules 120-125 to the hub 100 allows contemporaneous communication between each spoke module 120-125 and the hub 100. While the spoke modules 120-125 may not be able to communicate directly, communication between spoke modules 120-125 can via take place via the hub 100. It should be noted that while six spoke modules 120-125 are specifically shown, a greater or fewer number can likewise be implemented.

The spoke modules 120-125 each include one or more circuits such as microprocessors, microcontrollers, digital signal processors, field programmable gate arrays, programmable logic devices, state machines, logic circuitry, analog circuitry, digital circuitry, and/or any device that provides functionality of the corresponding spoke modules 120-125. Examples of such spoke modules 120-125 include: a central processing unit (CPU); an input/output module; a radio frequency (RF) transceiver circuit; a multimedia circuit, such as a graphics processor, audio/video codec; a modem circuit or other network interface; a peripheral interface circuit; a packet switch circuit; a collection of input/output devices or other general or special purpose circuit. Further details regarding the spoke modules 120-125 including optional functions, features and implementations are discussed in conjunction with FIGS. 4-5.

Hub 100 includes a control circuit 104 and memory module 106 that stores the hub software and hub data. In an embodiment of the present invention, the control circuit 104 is implemented via one or more programmable gate arrays, programmable logic devices, state machines, logic circuitry, analog circuitry, digital circuitry, and/or any other device that provides this functionality. The hub 100 optionally also includes one or more hub modules 112 such as other field programmable gate arrays, programmable logic devices, state machines, logic circuitry, analog circuitry, digital circuitry, and/or any device that provides other hub functionality, such as functions common to one or more spoke modules 120-125, that can be supplied by the hub module 112 to avoid duplication. Examples of such hub modules 112 include an audio processing circuit such as an audio codec, a video processing circuit such as a video codec or other circuit. Further, any of the spoke modules 120-125 can be optionally implemented via a hub module 112, for instance, when its functions and features are of a nature that they are used in conjunction with the operation or two or more spoke modules 120-125.

In an embodiment of the present invention, one or more of the spoke modules 120-125 includes a processing circuit that executes the hub software stored in memory module 106. Such a processing circuit can be implemented via use of one or more microprocessors, micro-controllers, digital signal processors, microcomputers, central processing units, field programmable gate arrays, programmable logic devices, state machines, logic circuitry, analog circuitry, digital circuitry, and/or any device or devices that manipulate signals (analog and/or digital) based on operational instructions. The memory module 106 can include a memory controller, a single memory device or a plurality of memory devices. Each such memory device can a read-only memory, random access memory, volatile memory, non-volatile memory, static memory, dynamic memory, flash memory, and/or any device that stores digital information. Note that when the processing circuit implements one or more of its functions via a state machine, analog circuitry, digital circuitry, and/or logic circuitry, the associated memory storing the corresponding operational instructions for this circuitry can be embedded with the circuitry comprising the state machine, analog circuitry, digital circuitry, and/or logic circuitry. While the description above places the processing circuit in one of the spoke modules 120-125, in an alternative embodiment, the processing circuit that executes the hub software can be included in hub 100.

In operation, it is the responsibility of the hub 100 to support the operation of each of the spoke modules 120-125. The control circuit 104 controls the routing of data and communications between spoke modules 120-125. In particular, control circuit 104 and or hub modules 112 operate to assess the requirements of each spoke module 120-125 and to provide them. This may include cross dependencies between functions implemented in spokes (for example a peripheral spoke may require a hub to service an interrupt in another spoke). These dependency can be recorded as an abstract (configured via hub software ahead of time) which indicates a particular function rather than a specific spoke module (e.g. the interrupt mentioned may be directed to an spoke which has the capability—of which there may me several types available and several instances within the system).

The hub 100 further includes a power management unit 110 that selectively supplies a plurality of power supply signals to the plurality of spoke modules 120-125 via the plurality of hub interfaces 102. In operation, the power management unit 110 operates to receive and arbitrate requests from the spoke modules 120-125 for power and supplies one or more power supply signals having currents and voltages that balance the needs of the spoke modules 120-125. In particular, the power management unit 110 can disconnect power to any of the spoke modules 120-125 that are deactivated and reconnect power when the are reactivated, increase power to spoke modules 120-125 that require more power, decrease power to spoke modules 120-125 that enter a standby mode and otherwise attempt to optimize distribution of available power resources of the integrated circuit.

The power management unit 110 also includes one or more circuits such as field programmable gate arrays, programmable logic devices, state machines, logic circuitry, digital circuitry, and/or a other processing device along with analog circuitry, including one or more voltage regulators or other power control circuits to respond to power requests and for adaptively generating the power supply signals to each of the spoke modules 120-125, in addition to the powering the modules of hub 100. In an embodiment of the present invention, the control circuitry of power management unit 110 operates automatically, independently from and contemporaneously with the hub software. This preserves the hub software for other tasks. Further details regarding the power management unit 110 including optional functions, features and implementations are discussed in conjunction with FIG. 6.

The hub 100 further includes a clock control circuit 108 that selectively supplies a plurality of clock signals to the plurality of spoke modules 120-125 via the plurality of hub interfaces 102. In operation, the clock control circuit 108 operates to receive and arbitrate requests from the spoke modules 120-125 for clock signals and supplies one or more clock signals at different phases and/or frequencies to support the needs of the spoke modules 120-125. In particular, the clock control circuit 108 can disconnect a clock signal from any of the spoke modules 120-125 that are deactivated and reconnect a clock signal when they are reactivated, and adjust the clock frequency to spoke modules 120-125 in response to requests, etc.

The clock control circuit 108 also includes one or more circuits such as field programmable gate arrays, programmable logic devices, state machines, logic circuitry, digital circuitry, and/or a other processing device along with analog circuitry, including one or more oscillators to respond to clock requests and for adaptively generating the clock signals to each of the spoke modules 120-125, in addition to the clock signals required by the modules of hub 100. In an embodiment of the present invention, the control circuitry of clock control circuit 108 operates automatically, independently from and contemporaneously with the hub software. This preserves the hub software for other tasks. Further details regarding the clock control circuit 108 including optional functions, features and implementations are discussed in conjunction with FIGS. 7-9.

The hub interfaces 102 each provides a signal interface, such as a fully asynchronous signaling path between the hub 100 and each of the plurality of spoke modules 120-125. In an embodiment of the present invention, each signal interface operates in accordance with a common signaling format. In this fashion, functionality can be added to the modular integrated circuit by designing a corresponding spoke module 120-125 and conforming the spoke module with the common signaling format. Logically, each spoke 120-125 may not have visibility to each other. In operation, the hub 100 controls the interoperability of the spoke modules 120-125 to execute applications that require functions from multiple spoke modules 120-125. Further details regarding the hub interfaces 102 including optional functions, features and implementations are discussed in conjunction with FIG. 3.

External interface 101 couples the modular integrated circuit to at least one external component. In an embodiment of the present invention, the external interface 101 includes a plurality of pins, pads or other direct electrical connections, and/or an RF interface, such as a 60 GHz or other millimeter wave RF interface for direct chip-to-chip communication or electromagnetic medium for coupling signals to/and from the modular integrated circuit. The external interface 101 can provide a synchronous signaling interface and/or an asynchronous signaling interface. In addition, while the external interface 101 is shown as being directly coupled to the hub 100, some or all of the functionality of external interface 101 can be provided by a single spoke module 120, 121, 122, 123, 124 or 125 or distributed among a plurality of the spoke modules 120-125.

Figure 3:
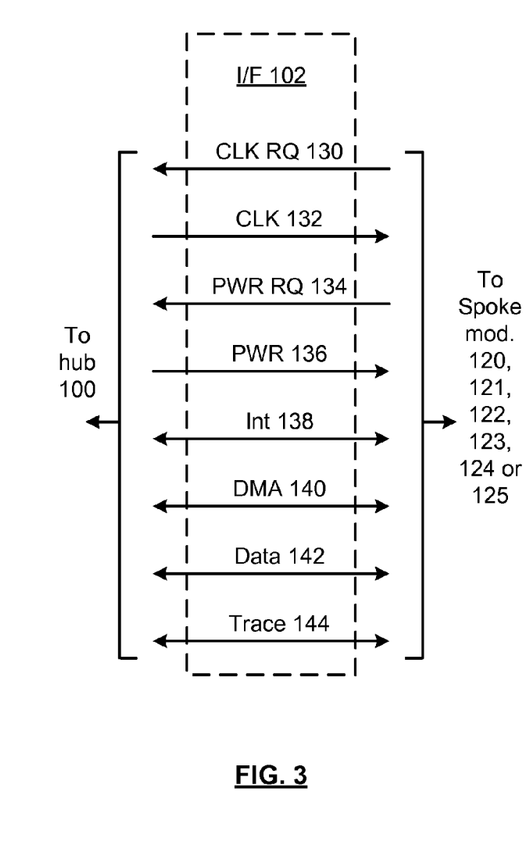
FIG. 3 presents a schematic block diagram representation of an interface 102 in accordance with an embodiment of the present invention.

FIG. 3 presents a schematic block diagram representation of an interface 102 in accordance with an embodiment of the present invention. As discussed in conjunction with FIG. 2, each hub interface 102 provides a signal interface, such as a fully asynchronous signaling path between the hub 100 and one of the plurality of spoke modules 120-125. In an embodiment of the present invention, each signal interface operates in accordance with a common signaling format. In this fashion, functionality can be added to the modular integrated circuit by designing a corresponding spoke module 120-125 and conforming the spoke module with the common signaling format. It should be noted that each of the signaling paths indicated in FIG. 3 can carry parallel or serial communication of multiple signals, including multiple contemporaneous signals.

The signaling format of interface 102 includes signal paths for transferring a clock request signal 130 from the spoke modules 120-125 to the clock control circuit 108 of the hub 100 and for transferring one or more clock signals 132 from the clock control circuit 108 to the corresponding spoke module 120, 121, 122, 123, 124 or 125. The signaling format of interface 102 also includes signal paths for transferring a power request signal 134 from one of the spoke modules 120-125 to the power management unit 110 of the hub 100 and for transferring one or more power supply signals 136 from the power management unit 110 to the corresponding spoke module 120, 121, 122, 123, 124 or 125.

In addition, the signaling format includes a signal path for transferring one or more interrupt request signals 138 from the spoke modules 120-125 to a processing circuit of either another spoke module or a processing circuit included in the hub 100. Further, the signaling format includes signal paths for transferring direct memory access commands and data 140, trace data 144 and other data between the spoke modules 120-125 and the processing circuit 104 and/or memory module 106 of the hub 100.

In an embodiment of the present invention, the interface 102 is implemented via parallel connections. Signaling between the hub 100 and spoke modules 120-125 can be asynchronous. Further, each of the plurality of signal interface 102 can be isolated from one another spatially and/or using other signal isolation techniques to minimize interference.

Figure 4:
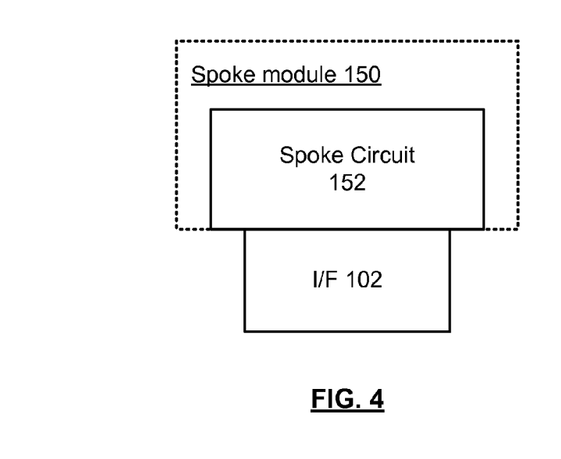
FIG. 4 presents a schematic block diagram representation of a spoke module 150 in accordance with an embodiment of the present invention.

FIG. 4 presents a schematic block diagram representation of a spoke module 150 in accordance with an embodiment of the present invention. In particular, spoke module 150 can implement any of the spoke modules 120-125. The spoke module 150 includes a spoke circuit 152 that interfaces directly with the signaling format of interface 102. The spoke circuit 152 can include one or more field programmable gate arrays, programmable logic devices, state machines, logic circuitry, analog circuitry, digital circuitry, and/or any device that provides the functionality of the corresponding spoke modules 150. Examples of such a spoke circuit 152 include: a radio frequency (RF) transceiver circuit; a multimedia circuit, such as a graphics processor, audio/video codec; a modem circuit or other network interface; a peripheral interface circuit; a packet switch circuit; or other special purpose circuit.

Figure 5:
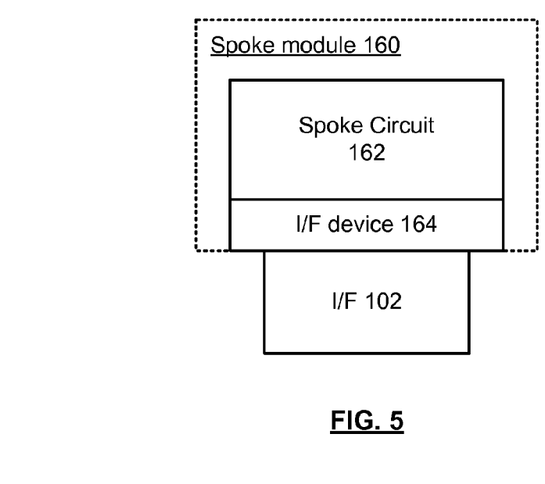
FIG. 5 presents a schematic block diagram representation of a spoke module 160 in accordance with an embodiment of the present invention.

FIG. 5 presents a schematic block diagram representation of a spoke module 160 in accordance with an embodiment of the present invention. In particular, spoke module 160 can implement any of the spoke modules 120-125. The spoke module 160 includes a spoke circuit 162 that interfaces indirectly with the signaling format of interface 102. Like spoke circuit 152, the spoke circuit 162 can include one or more field programmable gate arrays, programmable logic devices, state machines, logic circuitry, analog circuitry, digital circuitry, and/or any device that provides the functionality of the corresponding spoke modules 150. Examples of such a spoke circuit 162 include: a CPU; a radio frequency (RF) transceiver circuit; a multimedia circuit, such as a graphics processor, audio/video codec; a modem circuit or other network interface; a peripheral interface circuit; a packet switch circuit; or other special purpose circuit.

Unlike spoke circuit 152 however, spoke circuit 162 requires an interface device 164 that interfaces the spoke circuit 164 with the hub interface 102. In this fashion, spoke circuits designed with other interfaces can be converted for operation with hub 100 via the additional interface device 164. In particular, interface device 164 serves as a gasket to convert the signaling format of interface 102 to a signaling format of spoke circuit 162 and vice versa. In effect, the interface device 164 allows a spoke circuit 162 to emulate a corresponding spoke circuit 152 with the same functionality.

Figures 6, 7:
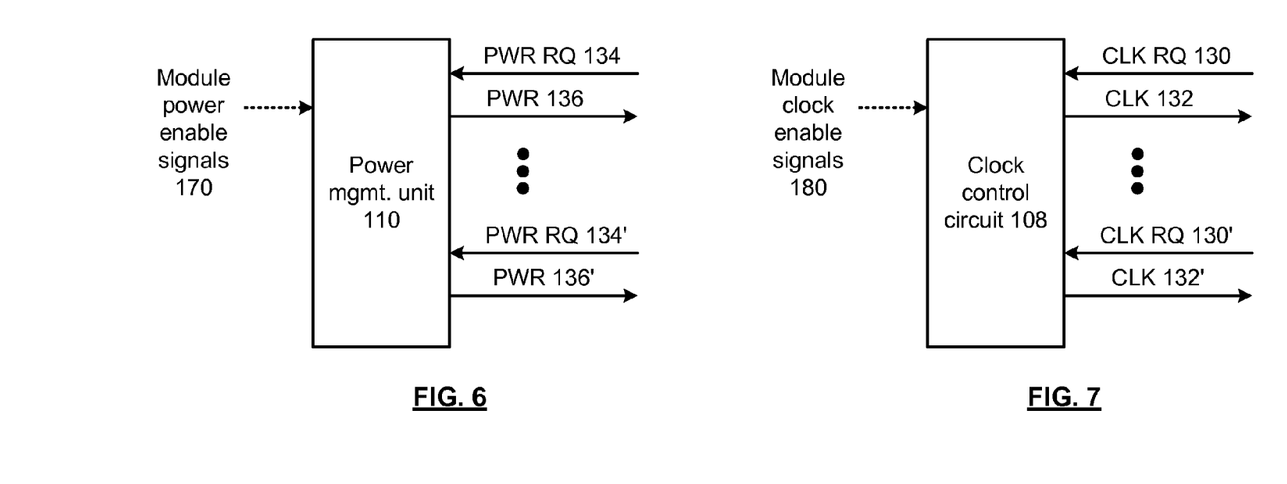
FIG. 6 presents a schematic block diagram representation of a power management unit 110 in accordance with an embodiment of the present invention.
FIG. 7 presents a schematic block diagram representation of a clock control circuit 108 in accordance with an embodiment of the present invention.

FIG. 6 presents a schematic block diagram representation of a power management unit 110 in accordance with an embodiment of the present invention. As discussed in conjunction with FIG. 2, the power management unit 110 operates to receive and arbitrate power requests (134, 134' . . . ) from the spoke modules 120-125 for power, and supplies one or more power supply signals (136, 136' . . . ) having currents and voltages that balance the needs of the spoke modules 120-125.

In an embodiment of the present invention, the power management unit 110 receives module power enable signals 170 from hub software, such as a configuration routine, application program or other software or firmware that instructs the power management unit 110 as to which of the spoke modules 120-125 are currently activated and which of the spoke modules 120-125 are currently deactivated. The power management unit 110 responds to the module power enable signals 170 to disconnect power to any of the spoke modules 120-125 that are deactivated and reconnect power when they are reactivated. As further discussed in conjunction with FIG. 2, power management unit 110 is further operable to increase the voltage or current of power supply signals (136, 136' . . . ) to any of the spoke modules 120-125 that require more power, decrease the voltage or current of power supply signals (136, 136' . . . ) to spoke modules 120-125 that enter a standby mode and otherwise attempt to optimize distribution of available power resources of the integrated circuit. In a further mode of operation, power requests (134, 134' . . . ) from the spoke modules 120-125 to the power management unit 110 can include minimum power requirements that need to be satisfied. The power management unit 110 operates to receive and arbitrate power requests (134, 134' . . . ) from the spoke modules 120-125 for power, and supplies one or more power supply signals (136, 136' . . . ) having currents and voltages that balance the needs of the spoke modules 120-125, by meeting the minimum requirements of each of the spoke modules 120-125 that are activated and meeting other power requests as allowed by distribution of available resources.

In an embodiment of the present invention, the power management unit 110 includes a look up table or state machine that responds to the current "state" of the hub 100 and spoke modules 120-125, in terms of which units are deactivated, and the power request signals (134, 134' . . . ) from the activated spoke modules 120-125, to determine appropriate values of the power supply signals (136, 136' . . . ).

FIG. 7 presents a schematic block diagram representation of a clock control circuit 108 in accordance with an embodiment of the present invention. As discussed in conjunction with FIG. 2, the clock control circuit 108 operates to receive and arbitrate clock request signals (130, 130' . . . ) from the spoke modules 120-125 for clock signals and supplies one or more clock signals (132, 132' . . . ) at different phases and/or frequencies to support the needs of the spoke modules 120-125. In particular, the clock control circuit 108 can disconnect a clock signal (132, 132' . . . ) from any of the spoke modules 120-125 that are deactivated and reconnect a clock signal (132, 132' . . . ) when they are reactivated, and adjust the clock frequency of clock signals (132, 132' . . . ) to spoke modules 120-125 in response to clock request signals (130, 130' . . . ), etc.

Figure 8:
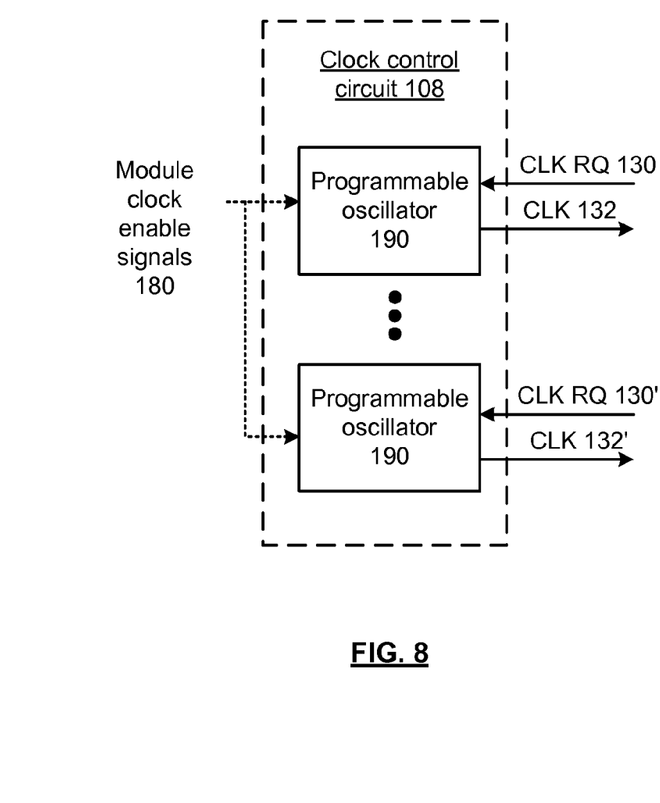
FIG. 8 presents a schematic block diagram representation of a clock control circuit 108 in accordance with another embodiment of the present invention.

FIG. 8 presents a schematic block diagram representation of a clock control circuit 108 in accordance with another embodiment of the present invention. In this embodiment of the present invention, the clock control circuit 108 includes a plurality of programmable oscillators 190 that each operate to:

(1) receive a clock request signal (130, 130' . . . ), from a corresponding one of the plurality of spoke modules 120-125 via the hub interface 102;

(2) generate at least one of the plurality of clock signals (132, 132' . . . ) in response to the clock request signal (130, 130' . . . ); and (3) send the at least one of the plurality of clock signals (132, 132' . . . ) to the corresponding one of the plurality of spoke modules 120-125 via the hub interface 102.

Each of the programmable oscillators 190 can include one or more fixed oscillators, a programmable frequency multiplier, frequency divider, phase-locked loop, voltage controlled oscillator, frequency synthesizer or other programmable oscillator that generates one or more clock signals at controlled phase and/or frequency in response to clock request signals (130, 130' . . . ).

Each of the programmable oscillators can be selectively enabled or disabled based on the optional module clock enable signals 180. In an embodiment of the present invention, the clock control circuit 108 receives module clock enable signals 180 from hub software, such as a configuration routine, application program or other software or firmware that instructs the clock control circuit 108 as to which of the spoke modules 120-125 are currently activated and which of the spoke modules 120-125 are currently deactivated. The clock control circuit 108 responds to the module clock enable signals 180 to selectively activate or deactivate each of the programmable oscillator 190, based on whether or not the corresponding spoke module 120-125 is activated or deactivated. In this fashion, the clock control circuit 108 supplies only those subset of clock signals (132, 132' . . . ) corresponding to only those subset of spoke modules 120-125 that are currently activated. While the foregoing description discusses the module clock enable signals 180 as being generated by the hub software, in an alternative embodiment, a module enable signal can be included in the hub interface 102 and supplied to the clock control circuit 108 from each of the spoke modules 120-125. Whether activated by hub software, spoke module, or other configuration data, the programmable oscillators operate to automatically adjust the clock signals (130, 130' . . . ), independently from and contemporaneously with the hub software or at least, independently of one or more application modules included in the hub software. This preserves the hub software, or time critical application modules included in the hub software, for other tasks.

In an embodiment of the present invention, the clock control circuit 108 supplies an initial clock signal (132, 132' . . . ) to a corresponding spoke module (120-125) in response to an indication that it has been activated. The initial clock signal can be at a nominal frequency and/or phase, the highest frequency of operation of the corresponding spoke module (120-125), the lowest frequency of operation of the corresponding spoke module (120-125), a median frequency of operation of the corresponding spoke module (120-125), or otherwise the frequency used by the corresponding spoke module (120-125) after activation, during set-up and initialization, etc. When the spoke module (120-125) is ready to operate at a different frequency, for instance in a full power mode, standby mode, or a normal operating state, the spoke module (120-125) generates a clock request signals 130 or 130' etc. to request the new clock frequency. In response to the clock request signal 130 or 130', etc. the corresponding programmable oscillator adjusts the clock frequency of the corresponding clock signal 132, 132', etc.

Figure 9:
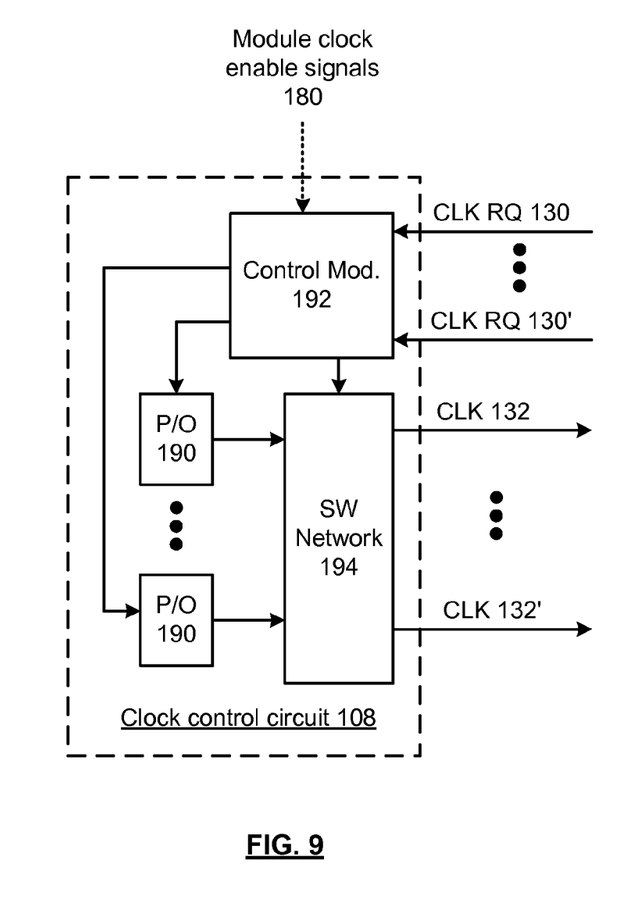
FIG. 9 presents a schematic block diagram representation of a clock control circuit 108 in accordance with another embodiment of the present invention.

FIG. 9 presents a schematic block diagram representation of a clock control circuit 108 in accordance with another embodiment of the present invention. In this embodiment, clock control circuit 108 includes N programmable oscillators for generating N clock signals (132, 132' . . . ). In contrast to the configuration of FIG. 8 where each of the programmable oscillators is dedicated to a particular hub interface 102, in this configuration, a control module 192 couples one or more of the programmable oscillators 109 to selected ones of the hub interfaces 102 via switch network 194.

In operation, the control module 192 receives and routes the clock request signals (130, 130' . . . ) from the spoke modules 120-125 to selected programmable oscillators 190. The switch network 194 operates under the control of the control module 192 to route the clock signals (132, 132' . . . ) from the programmable oscillators 190 to the signal interfaces of the corresponding hub interfaces. In a similar fashion to the embodiment of FIG. 8, control module 192 controls the generation and routing of clock signals (132, 132' . . . ) to respond to module clock enable signals 180, providing clock signals, only to those spoke modules 120-125 that are activated.

In an embodiment of the present invention, the switch network 194 includes one or more multiplexers, demultiplexers, transistors or other switching devices. Control module 192 can be implemented via one or more field programmable gate arrays, programmable logic devices, state machines, logic circuitry, analog circuitry, digital circuitry, and/or any other processing device.

Figure 10:
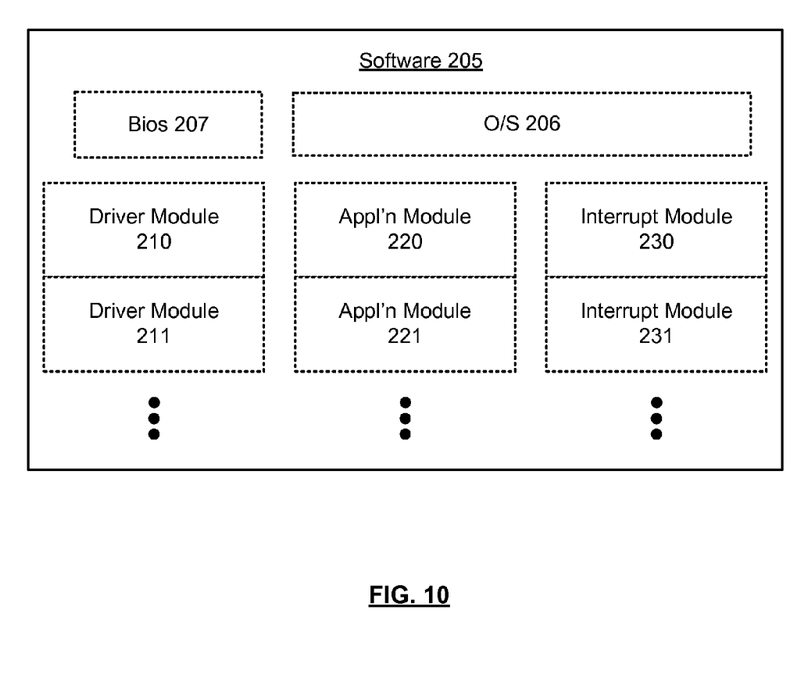
FIG. 10 presents a block diagram representation of software 205 in accordance with an embodiment of the present invention.

FIG. 10 presents a block diagram representation of software 205 in accordance with an embodiment of the present invention. In particular, the software 205 includes hub software stored in memory module 106 and executed by processing circuit 104. Software 205 includes boot firmware 207, such as a ROM basic input output system (BIOS), extensible firmware interface (EFI) or other boot firmware and an operating system 206 such as Symbian Android, Linux, a Windows-based operating system or other operating system. Software 205 can also be designed in a modular fashion to include one or more interrupt modules 230, 231, . . . for servicing interrupt requests such as a plurality of standard interrupts 138 generated by any of the spoke modules 120-125, and/or other interrupts used in conjunction with the operation of the modular integrated circuit.

In addition, software 205 includes a plurality of application modules 220, 221, that correspond to different operating modes of the modular integrated circuit and that optionally involve interaction with one or more of the spoke modules 120-125. Software 205 can include one or more driver modules 210, 211 . . . that can include drivers for use with each of the spoke modules the spoke modules 120-125. In operation, the boot firmware 207 operates in a similar fashion to a PCI hardware detection tool to discover the particular spoke modules that are present and to configure the operating system with the drivers associated with these devices—thus allowing one set of common software to support multiple SOC designs. Unlike a standard PCI plug and play architecture however, the spoke modules 120-125 of the modular integrated circuit are fixed for a particular device. In this fashion, configuration data can be pre-stored for a particular device. The configuration data can, for instance, specify: a particular hub interface 102, the device class, how many devices are present, functions associated with each device and the hardware base address. This means that the spoke modules 120-125 need not be probed each time the device is booted to determine which spoke modules are present—the pre-stored configuration data can be consulted instead to save this step. In an embodiment of the present invention, one of the spoke modules 120-125 can be designed as the default device to control this discovery process upon boot-up of the device.

The configuration data can be stored in memory module 106 such as in ROM or flash memory of the device. Alternatively the configuration data can be stored at the system level in a separate one time programmable memory of flash memory of the printed circuit board that hosts the device. In an embodiment of the present invention, the spoke modules include a plurality of interface circuits each having a corresponding hardware address. The processing module of the modular integrated circuit executes boot firmware to configure the plurality of driver modules (210, 211, . . . ) based on the hardware address of each of the plurality of interface circuits. The configuration data can include functions indicating the mapping of the devices of each spoke module onto the system. The particular function used for the device at any particular time can be based on, for instance, the particular application module (220, 221, . . . ) being executed or otherwise based on the particular function selected by a particular application.

For example, a single UART included in an I/O spoke module might be used alternatively for debugging, as a connection to a separate Bluetooth circuit, as a touch screen interface or might be simply unconnected. Consequently, the boot firmware configures with multiple drivers modules (210, 211, . . . ), corresponding to this UART. In operation, the particular application module (220, 221, . . . ) being executed selects the appropriate driver module based on the particular function to be performed.

The operation of the software 205 can be described in conjunction with a further example where the modular integrated circuit implements a voice and data integrated circuit used in the implementation of a web-enabled smart phone. General application modules 220 and 221 include a telephone call application, a text messaging application, a streaming audio application, a streaming video application, a mapping and navigation application, one or more game applications, an audio/video player application, a web browser, and other web-enabled applications. Each of the applications, use the drivers that have been configured by the operating system to the underlying hardware present in the spoke modules 120-125. The application modules (220, 221, . . . ) can optionally store additional application data as hub data in memory module 106 that indicates, for example, which of the spoke modules 120-125 are activated, which are deactivated, optional initial states for the spoke modules 120-125, the driver modules or modules (210, 211, ... ) assigned to each spoke module, and/or associated functions, etc.

Figure 11:
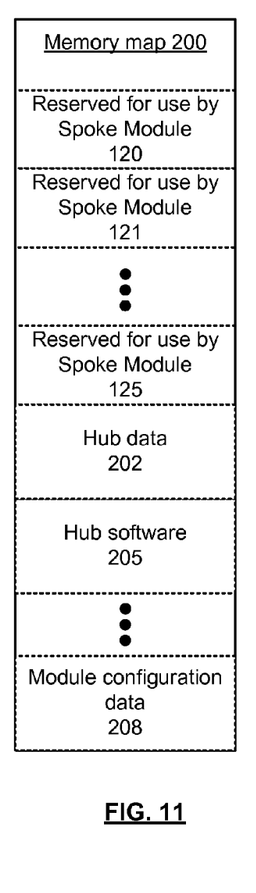
FIG. 11 presents a block diagram representation of spoke table 300 in accordance with an embodiment of the present invention.

FIG. 11 presents a block diagram representation of spoke table 300 in accordance with an embodiment of the present invention. In particular, the spoke table 300 can be stored in ROM, flash memory or other non-volatile storage and is used by the software 205 to store information regarding the particular spoke modules 120-125 that are included in the modular integrated circuit.

As reflected in this example of spoke table 300, spoke modules 120-125 of the integrated circuit include:

Spoke 1—in interface module that includes a UART that functions as a debug interface, Bluetooth connection, and a touch screen interface. While a single input/output device is illustrated a single spoke module may typically include multiple I/O devices. Further while multiple functions are shown as being attributed to a single UART, in the alternative, multiple UARTs may be included to perform multiple functions.

Spoke 2—a GSM RF transceiver module for communicating with a wireless telephony network, that uses baseband processing from the processing circuit 104 of the hub 100.

The hardware addresses X, and Y correspond to base addresses of the corresponding hardware. While two particular spoke modules are illustrated, the modular integrated circuit could include additional spoke modules that are not shown.

When the device is booted up, the boot firmware 207 retrieves the spoke table 300 and associates each function of each spoke module with a driver module (210, 211, ... ). In addition, the driver modules (210, 211, ... ). Are configured with the hardware address of the corresponding device in the spoke module. In this fashion, when the operating system 206 executes a general application that uses a device of a particular spoke module 120-125, the corresponding driver module (210, 211, ... ). can be executed by the processing circuit 104 of the hub 100 to support the operation of that device.

Following along with the example above, a driver module 210 can be configured to use a UART from spoke 1 as a touch screen interface and a driver module 211 can be configured for GSM baseband processing for an RF transceiver of spoke 2. Consider a spoke 3 that includes a CPU that executes an application program 220 for GSM telephony. In operation, a dialed number is received as data via spoke 1 and transferred, via the hub 100, to spoke 2 for processing and transmission to a GSM network to place a telephone call.

In addition to containing information specifically about the peripherals, the boot firmware 207 may include other more general capabilities—which could be software information or functions directly interpreted by hardware (with software only operating to configure the hardware). For example generic "interrupt handling capability" could be provided to indicate where interrupts should be directed rather than rely on software to understand which of potentially many cores are present in the system. This provision of generic capabilities is in addition to the direct identification of the underlying hardware function. Similarly the boot firmware 207 can provide other information about each underlying capability (for example indicating to software or hardware whether a particular spoke is preferred over another for a function (e.g. send interrupts to this spoke unless this other is also active or restrict this spoke to a particular voltage/clock under the following circumstances e.g. temperature is high, or performance restriction bits are set), etc.

Figure 12:
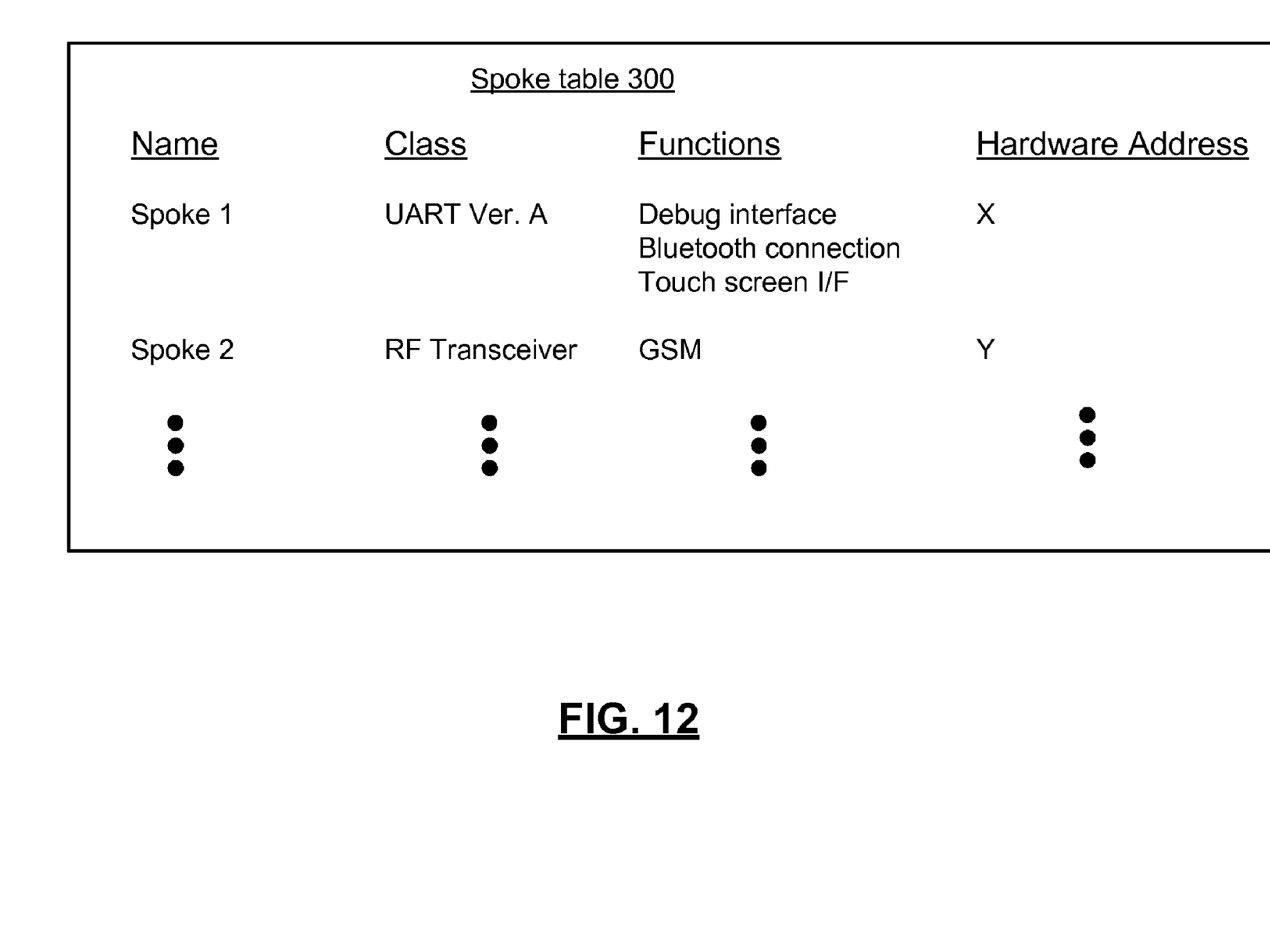
FIG. 12 presents a block diagram representation of memory map 200 in accordance with an embodiment of the present invention.

FIG. 12 presents a block diagram representation of memory map 200 in accordance with an embodiment of the present invention. In particular, the memory map 200 corresponds to one or more memory devices of memory module 106. Memory map includes addresses reserved for the hub software 205 and hub data 202 such as stored documents, settings, preferences, audio video files, cookies files, and other data. In addition, the memory may reserve certain addresses for module configuration data 208 that indicates, for example, which of the spoke modules 120-125 are activated, which are deactivated, optional initial states for the spoke modules 120-125, etc.

In addition, memory map 200 includes a plurality of reserved blocks corresponding to each of the spoke modules 120-125. Such reserved addresses can include register addresses for DMA data transfers, optional buffer addresses, optional cache addresses and other addresses that are dedicated to the operation of the corresponding spoke module 120-125. In an embodiment of the present invention, the number of memory addresses reserved for each module is fixed and is the same for each module to promote a modular design where modules can be interchanged in different designs with minimal impact on the memory map 200. It should be noted that blocks of memory addresses can be reserved for each of the spoke modules 120-125, whether or not each spoke module is activated or deactivated.

Further a further example, the hub 100 is designed to support a maximum number of spoke modules M. Core 100 includes M hub interfaces and M blocks of memory are reserved in the memory map 200. In actual implementation, fewer that M spoke modules can be implemented in a particular design. However, memory addresses can still be reserved for the missing (or optional) spoke modules corresponding to a block of memory reserved for the missing or optional spoke module. Said another way, a hub interface 102 and a block of addresses in memory map 200 can be reserved for a spoke module that is absent from the design. This reserves address space for the addition of future spoke modules, while ensuring the simplicity preserved by the modular nature of the design.

Figure 13:
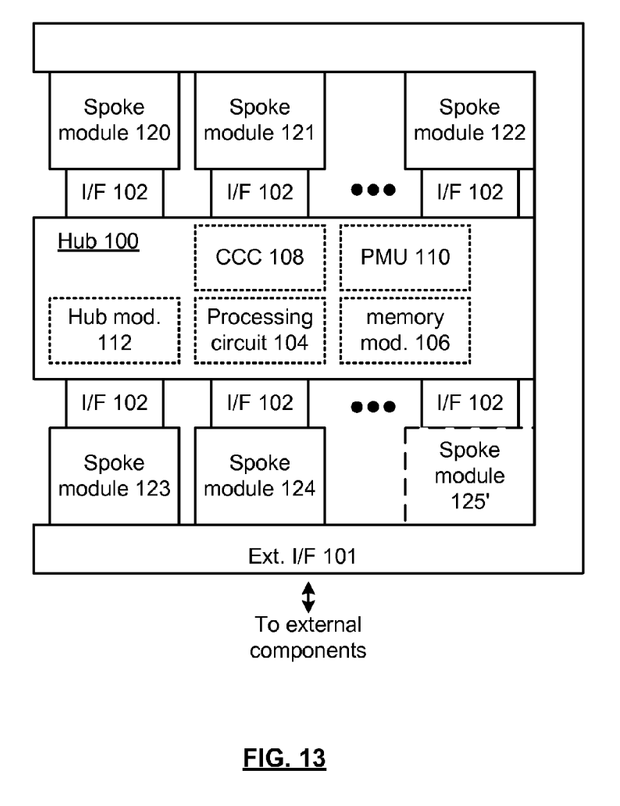
FIG. 13 presents a schematic block diagram representation of a modular integrated circuit in accordance with an embodiment of the present invention.

FIG. 13 presents a schematic block diagram representation of a modular integrated circuit in accordance with an embodiment of the present invention. In particular, a modular integrated circuit is presented that includes one or more functions and features described in conjunction with FIGS. 1-12. Similar elements that have been previously described are referred to by common reference numerals. In this embodiment however, spoke modules 120-124 are as previously described, but spoke module 125' is present, but is deactivated permanently. In particular, spoke module 125' can be a module included in the design but determined to be non-functional or unnecessary. Spoke module 125' can be deactivated by configuration data as previously described, so as to remain un-powered and un-clocked on a permanent basis.

As discussed in conjunction with FIG. 12, spoke module 125' can nevertheless have a block of memory addresses reserved memory in memory map 200, ease the implementation of future designs with a functional spoke module 125.

Figure 14:
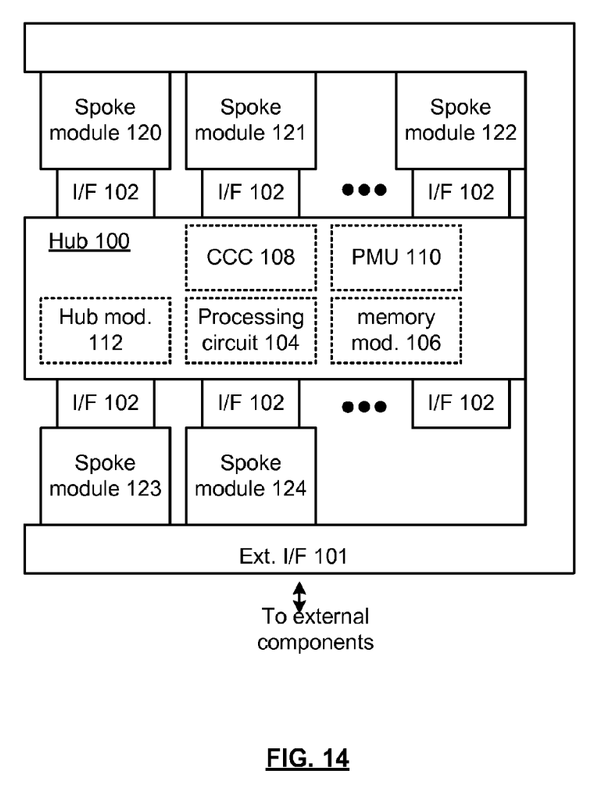
FIG. 14 presents a schematic block diagram representation of a modular integrated circuit in accordance with an embodiment of the present invention.

FIG. 14 presents a schematic block diagram representation of a modular integrated circuit in accordance with an embodiment of the present invention. In particular, a modular integrated circuit is presented that includes one or more functions and features described in conjunction with FIGS. 1-13. Similar elements that have been previously described are referred to by common reference numerals. In this embodiment however, spoke modules 120-124 are as previously described, but spoke module 125 is absent from the design. Hub interface 102' is still included in the design, but is deactivated permanently, and optionally the signaling paths are terminated to prevent spurious signaling.

As discussed in conjunction with FIG. 12, interface 102' can nevertheless have a block of memory addresses reserved in memory map 200, corresponding to a phantom spoke module 125 that is absent from the design. As previously discussed, this eases the implementation of future designs that may include spoke module 125, while eliminating the need to change hub 100 to eliminate the hub interface 102'.

Figure 15:
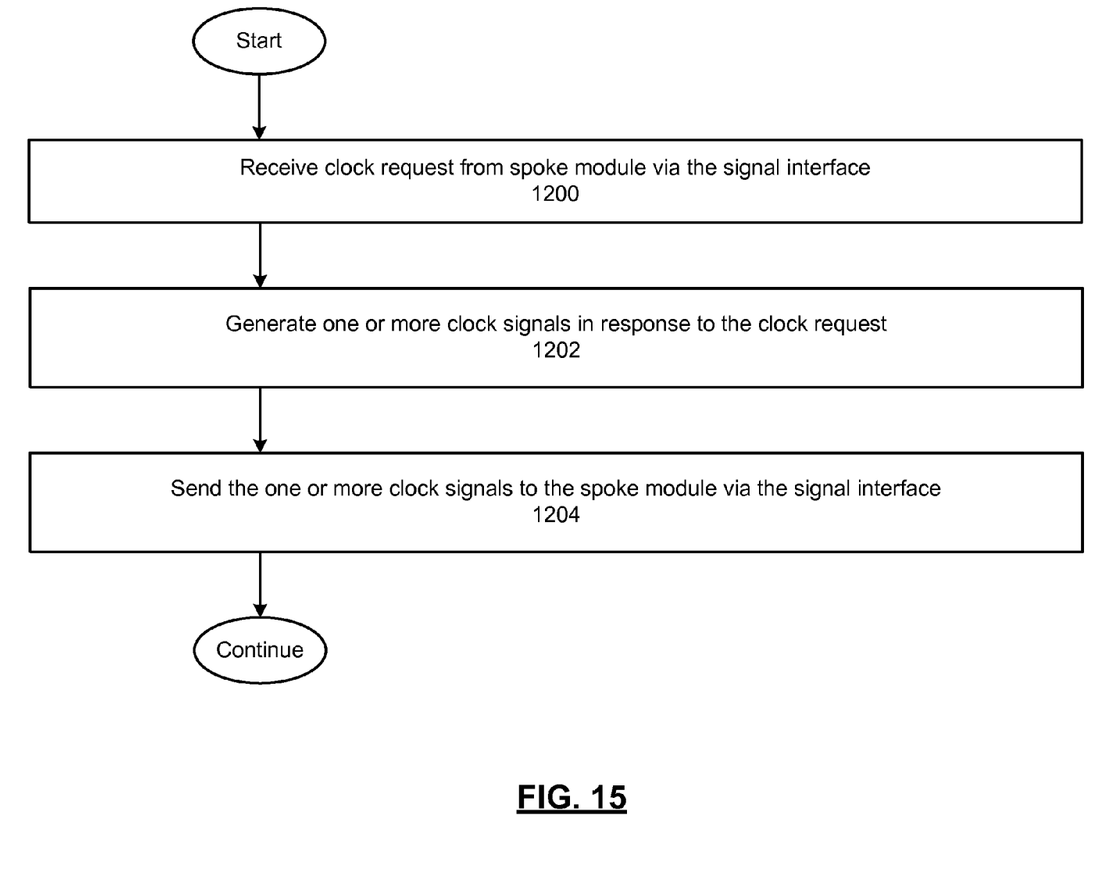
FIG. 15 presents a flowchart representation of a method in accordance with an embodiment of the present invention.

FIG. 15 presents a flowchart representation of a method in accordance with an embodiment of the present invention. In particular, a method is presented for use with one or more functions and features described in conjunction with FIGS. 1-14. In step 1200 a clock request signal is received via a signal interface. In step 1202, One or more clock signals are generated in response to the clock request signal. In step 1204, the one or more clock signals are sent to the spoke module via the signal interface.

Figure 16:
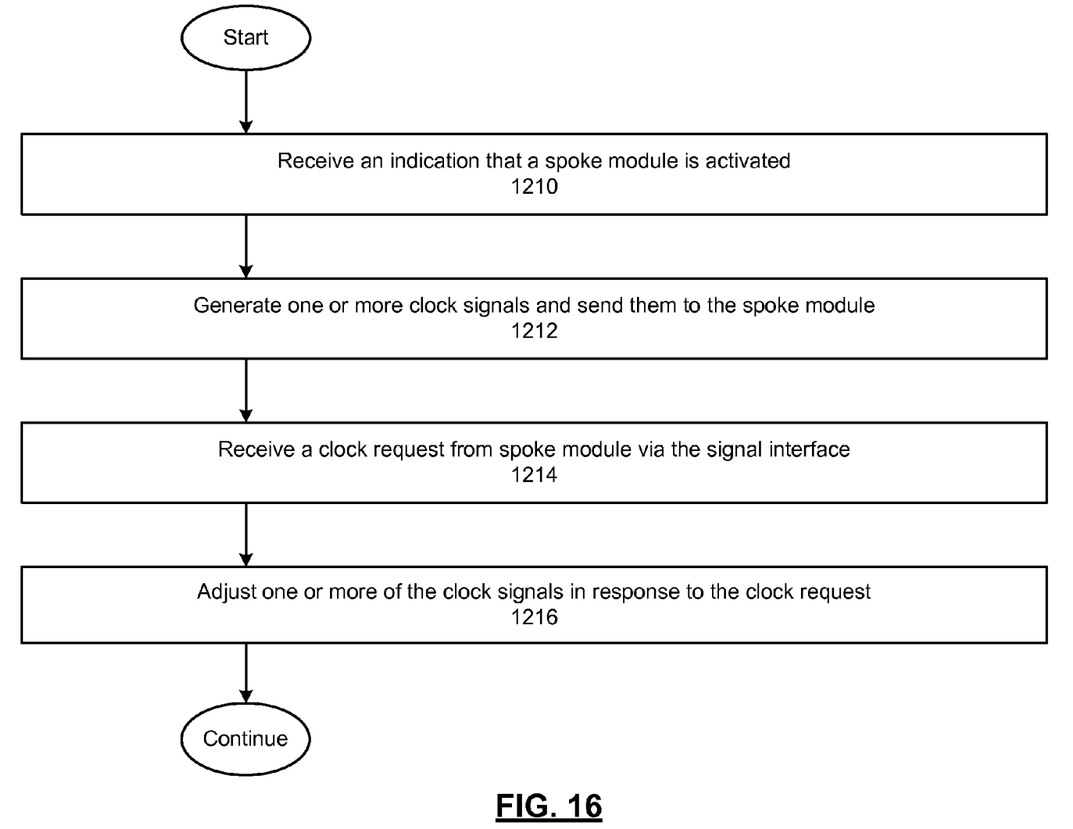
FIG. 16 presents a flowchart representation of a method in accordance with an embodiment of the present invention.

FIG. 16 presents a flowchart representation of a method in accordance with an embodiment of the present invention. In step 1210, an indication that a spoke module is activated is received. In step 1212, one or more clock signals, such as initial clock signals, are generated and sent to the spoke module. When the spoke module is ready to operate at a different frequency, for instance in a full power mode, standby mode, or a normal operating state, the spoke module generates a clock request signal that is received via a signal interface, as shown in step 1214. One or more of the clock signals are adjusted in response to the clock request signal, as shown in step 1216.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A modular integrated circuit comprising:
a plurality of spoke modules; and
a plurality of hub interfaces, each of the plurality of hub modules coupled to a corresponding one of the plurality of spoke modules to provide a signal interface;
a hub module that is coupled to the plurality of spoke modules via a non-bus architecture that facilitates inter-spoke communication via the hub and the plurality of hub interfaces, the hub module including:
a memory module, coupled to the plurality of hub interfaces, that stores hub software and hub data;
a power management unit, coupled to the plurality of hub interfaces, that selectively supplies a plurality of power supply signals to the plurality of spoke modules via the plurality of hub interfaces; and
a clock control circuit, coupled to the plurality of hub interfaces, that selectively supplies a plurality of clock signals to the plurality of spoke modules by:
receiving a clock request signal from a corresponding one of the plurality of spoke modules via the signal interface of the corresponding one of the plurality of hub interfaces;
generating at least one of the plurality of clock signals in response to the clock request signal; and sending the at least one of the plurality of clock signals to the corresponding one of the plurality of spoke modules via the signal interface of the corresponding one of the plurality of hub interfaces.

2. The modular integrated circuit of claim 1 wherein the clock control circuit receives module clock enable signals that selects a subset of plurality of spoke modules, and wherein the clock control circuit supplies the plurality of clock signals to the subset of plurality of spoke modules to the selected subset of the plurality of spoke modules.

3. The modular integrated circuit of claim 2 wherein the module clock enable signals are received from a processing circuit.

4. The modular integrated circuit of claim 1 wherein the clock control circuit selects a subset of plurality of spoke modules based on the clock request signals received from the subset of plurality of spoke modules, and wherein the clock control circuit supplies the plurality of clock signals to the subset of plurality of spoke modules to the selected subset of the plurality of spoke modules.

5. The modular integrated circuit of claim 1 wherein the clock control circuit supplies a first clock signal to a corresponding one of the plurality of spoke modules and wherein generating the at least one of the plurality of clock signals in response to the clock request signal includes adjusting a clock frequency of the first clock signal in response to the clock request signal.

6. The modular integrated circuit of claim 1 wherein the clock control circuit includes a plurality of programmable oscillators that generate the plurality of clock signals.

7. The modular integrated circuit of claim 6 wherein the clock control circuit further includes:
a control module for routing the clock request signal from the corresponding one of the plurality of spoke modules to at least one of the plurality of programmable oscillators; and
a switch network for routing the at least one of the plurality of clock signals from the at least one of the plurality of programmable oscillators to the signal interface of the corresponding one of the plurality of hub interfaces.

8. The modular integrated circuit of claim 1 wherein the clock control circuit operates independently from the hub software.

9. The modular integrated circuit of claim 1 wherein the plurality of spoke modules include at least one of:
a processing circuit for executing at least a portion of the hub software;
a radio frequency transceiver circuit;
a multimedia circuit;
a modem circuit;
a peripheral interface circuit; and
a packet switch circuit.

10. The modular integrated circuit of claim 1 wherein at least one of the plurality of spoke modules includes an interface device that interfaces a spoke circuit with a corresponding one of the plurality of hub interfaces.

11. A modular integrated circuit comprising:
a plurality of spoke modules; and
a plurality of hub interfaces, each of the plurality of hub modules coupled to a corresponding one of the plurality of spoke modules to provide a signal interface;
a hub module that is coupled to the plurality of spoke modules via a non-bus architecture that facilitates inter-spoke communication via the hub and the plurality of hub interfaces, the hub module including:
a memory module, coupled the plurality of hub interfaces, that stores hub software and hub data;
a power management unit, coupled to the plurality of hub interfaces, that selectively supplies a plurality of power supply signals to the plurality of spoke modules via the plurality of hub interfaces; and
a clock control circuit, coupled to the plurality of hub interfaces, that selectively supplies a plurality of clock signals to the plurality of spoke modules by:
receiving a clock request signal from a corresponding one of the plurality of spoke modules via the signal interface of the corresponding one of the plurality of hub interfaces;
generating at least one of the plurality of clock signals in response to the clock request signal; and
sending the at least one of the plurality of clock signals to the corresponding one of the plurality of spoke modules via the signal interface of the corresponding one of the plurality of hub interfaces.

12. The modular integrated circuit of claim 11 wherein the clock control circuit receives module clock enable signals that selects a subset of plurality of spoke modules, and wherein the clock control circuit supplies the plurality of clock signals to the subset of plurality of spoke modules to the selected subset of the plurality of spoke modules.

13. The modular integrated circuit of claim 12 wherein the module clock enable signals are received from the processing circuit.

14. The modular integrated circuit of claim 11 wherein the clock control circuit selects a subset of plurality of spoke modules based on the clock request signals received from the subset of plurality of spoke modules, and wherein the clock control circuit supplies the plurality of clock signals to the subset of plurality of spoke modules to the selected subset of the plurality of spoke modules.

15. The modular integrated circuit of claim 11 wherein the clock control circuit supplies a first clock signal to a corresponding one of the plurality of spoke modules and wherein generating the at least one of the plurality of clock signals in response to the clock request signal includes adjusting a clock frequency of the first clock signal in response to the clock request signal.

16. The modular integrated circuit of claim 11 wherein the clock control circuit includes a plurality of programmable oscillators that generate the plurality of clock signals.

17. The modular integrated circuit of claim 16 wherein the clock control circuit further includes:
a control module for routing the clock request signal from the corresponding one of the plurality of spoke modules to at least one of the plurality of programmable oscillators; and
a switch network for routing the at least one of the plurality of clock signals from the at least one of the plurality of programmable oscillators to the signal interface of the corresponding one of the plurality of hub interfaces.

18. The modular integrated circuit of claim 11 wherein the clock control circuit operates independently from the hub software.

19. The modular integrated circuit of claim 11 wherein the plurality of spoke modules include at least one of:
a processing circuit for executing at least a portion of the hub software;
a radio frequency transceiver circuit;
a multimedia circuit;
a modem circuit;
a peripheral interface circuit; and
a packet switch circuit.

20. The modular integrated circuit of claim 11 wherein at least one of the plurality of spoke modules includes an interface device that interfaces a spoke circuit with a corresponding one of the plurality of hub interfaces.

21. A modular integrated circuit comprising:
a plurality of spoke modules; and
a plurality of hub interfaces, each of the plurality of hub modules coupled to a corresponding one of the plurality of spoke modules to provide a signal interface;
a hub module that is coupled to the plurality of spoke modules via a non-bus architecture that facilitates inter-spoke communication via the plurality of hub interfaces, the hub module including:
a memory module, coupled the plurality of hub interfaces, that stores hub software and hub data;
a power management unit, coupled to the plurality of hub interfaces, that selectively supplies a plurality of power supply signals to the plurality of spoke modules via the plurality of hub interfaces; and
a clock control circuit, coupled to the plurality of hub interfaces, that selectively supplies a plurality of clock signals to the plurality of spoke modules by:
receiving a clock request signal from a corresponding one of the plurality of spoke modules via the signal interface of the corresponding one of the plurality of hub interfaces;
generating at least one of the plurality of clock signals in response to the clock request signal; and
sending the at least one of the plurality of clock signals to the corresponding one of the plurality of spoke modules via the signal interface of the corresponding one of the plurality of hub interfaces.

* * * * *

UNITED STATES PATENT AND TRADEMARK OFFICE
CERTIFICATE OF CORRECTION

| | | |
|---|---|---|
| PATENT NO. | : 8,392,745 B2 | Page 1 of 1 |
| APPLICATION NO. | : 12/767226 | |
| DATED | : March 5, 2013 | |
| INVENTOR(S) | : Greg Goodemote et al. | |

It is certified that error appears in the above-identified patent and that said Letters Patent is hereby corrected as shown below:

Title Page, Item (75) Inventors: Replace "Niray P. Dagli" with --Nirav P. Dagli--

Signed and Sealed this
Thirteenth Day of August, 2013

Teresa Stanek Rea
*Acting Director of the United States Patent and Trademark Office*